(12) United States Patent
Kalous et al.

(10) Patent No.: US 9,141,090 B2
(45) Date of Patent: Sep. 22, 2015

(54) ACCESS CODE MANAGEMENT SYSTEMS

(71) Applicant: Master Lock Company, Oak Creek, WI (US)

(72) Inventors: D. Scott Kalous, Kenosha, WI (US); Matthew Trapani, Deerfield, IL (US)

(73) Assignee: Master Lock Company LLC, Oak Creek, WA (US)

( * ) Notice: Subject to any disclaimer, the term of this patent is extended or adjusted under 35 U.S.C. 154(b) by 89 days.

(21) Appl. No.: 13/673,095

(22) Filed: Nov. 9, 2012

(65) Prior Publication Data

US 2013/0120110 A1    May 16, 2013

Related U.S. Application Data

(60) Provisional application No. 61/558,649, filed on Nov. 11, 2011.

(51) Int. Cl.

| | |
|---|---|
| *G05B 19/00* | (2006.01) |
| *G05B 23/00* | (2006.01) |
| *G08B 29/00* | (2006.01) |
| *H04B 1/00* | (2006.01) |
| *G06F 7/04* | (2006.01) |
| *G06F 17/30* | (2006.01) |
| *H04L 29/06* | (2006.01) |
| *H04L 9/32* | (2006.01) |

(Continued)

(52) U.S. Cl.
CPC .............. *G05B 1/01* (2013.01); *G07C 9/00571* (2013.01); *G07C 9/0069* (2013.01); *G07C 2009/00476* (2013.01)

(58) Field of Classification Search
CPC .................................. G06F 21/00; G06F 1/24
USPC .......................................................... 340/5.6
See application file for complete search history.

(56) References Cited

U.S. PATENT DOCUMENTS

| | | | |
|---|---|---|---|
| 5,321,242 A | 6/1994 | Heath, Jr. | |
| 6,097,306 A * | 8/2000 | Leon et al. | ..................... 340/5.1 |
| 6,300,873 B1 | 10/2001 | Kucharczyk et al. | |

(Continued)

FOREIGN PATENT DOCUMENTS

| | | |
|---|---|---|
| GB | 2372126 A | 8/2002 |
| WO | 98/58327 A1 | 12/1998 |

OTHER PUBLICATIONS

International Search Report and Written Opinion from International Application No. PCT/US2012/064355, date of mailing Feb. 5, 2013. i.

(Continued)

*Primary Examiner* — Jennifer Mehmood
*Assistant Examiner* — Pameshanand Mahase
(74) *Attorney, Agent, or Firm* — Calfee, Halter & Griswold LLP

(57) ABSTRACT

In a method of managing access codes, a product is provided with an access restricting mechanism configured to permit operation of the product in response to entry of either one of first and second access codes using a code interface. The first access code is displayed on the product without displaying the second access code on the product. The second access code is identified to a user in response to user input of at least one of the first access code and a serial number into a terminal in communication with an electronically accessible code storage unit associating the second access code with the at least one of the first access code and the serial number.

22 Claims, 2 Drawing Sheets

(51) Int. Cl.
*G05B 1/01* (2006.01)
*G07C 9/00* (2006.01)

(56) References Cited

U.S. PATENT DOCUMENTS

| | | | |
|---|---|---|---|
| 6,343,361 B1 * | 1/2002 | Nendell et al. | 713/171 |
| 6,570,488 B2 * | 5/2003 | Kucharczyk et al. | 340/5.2 |
| 6,696,918 B2 | 2/2004 | Kucharczyk et al. | |
| 6,975,202 B1 * | 12/2005 | Rodriguez et al. | 340/5.25 |
| 7,012,503 B2 | 3/2006 | Nielsen | |
| 7,480,805 B1 * | 1/2009 | Gnech et al. | 713/183 |
| 2002/0180582 A1 * | 12/2002 | Nielsen | 340/5.6 |
| 2006/0232399 A1 * | 10/2006 | Martin | 340/539.16 |
| 2007/0008142 A1 * | 1/2007 | Crowe et al. | 340/572.8 |
| 2008/0109896 A1 * | 5/2008 | Millar | 726/19 |
| 2009/0083851 A1 | 3/2009 | Michelle et al. | |
| 2009/0212904 A1 * | 8/2009 | Yamashita et al. | 340/5.22 |
| 2009/0315670 A1 * | 12/2009 | Naressi et al. | 340/5.8 |
| 2011/0128121 A1 * | 6/2011 | Shachar et al. | 340/5.24 |

OTHER PUBLICATIONS

Search Report from European Patent Application No. 12847851.8 date Jul. 2, 2015.

* cited by examiner

ACCESS CODE MANAGEMENT SYSTEMS

CROSS-REFERENCE TO RELATED APPLICATION

This application claims the benefit of and priority to U.S. Provisional Patent Application Ser. No. 61/558,649, entitled "ACCESS CODE MANAGEMENT SYSTEMS" and filed Nov. 11, 2011, the entire disclosure of which is incorporated herein by reference, to the extent that it is not conflicting with the present application.

BACKGROUND

Combination locks are used in commercial, residential, and institutional environments to provide lockable access to personal items and/or enclosures. The combination lock may be a separate device, such as a combination padlock, which may be shackled to a door, bracket, cable, or other item to restrict access. Alternatively, the combination lock may be integral to an enclosure, such as a safe or a storage locker. Combination locks include mechanical (e.g., single-dial, multiple-dial, and mechanical keypad) and electromechanical (e.g., electronic keypad) designs. These designs allow for authorized access without possession of a mechanical or electronic key (e.g., bitted mechanical key, RFID card, wireless transceiver/fob, etc.).

While the use of a combination lock, as compared to a key-based lock, may eliminate the risk of lost, stolen, or copied keys, an authorized access code (e.g., dial or keypad sequence or combination) may be forgotten, preventing access to the locked item by the authorized user. Further, in a situation where an administrator or other such individual needs access to the locked item or items, it may be difficult or impossible to keep track of the authorized combinations, particularly where the combination code is changeable by the user.

SUMMARY

In an exemplary method of managing access codes for an access restricted product, a product is provided with an access restricting mechanism configured to permit operation of the product in response to entry of either one of first and second access codes using a code interface. The first access code is displayed on the product without displaying the second access code on the product. The second access code is identified to a user in response to user input of at least one of the first access code and a serial number into a terminal in communication with an electronically accessible code storage unit associating the second access code with the at least one of the first access code and the serial number.

In another exemplary embodiment, an access code management system for an access restricted product includes a product and a computer readable medium. The product includes a code interface and an access restricting mechanism. The access restricting mechanism is configured to permit operation of the product in response to entry of either one of a first access code and a second access code using the code interface. A computer readable medium and a computer or portable communication device operating the medium is configured to access a code storage unit associating the second access code with at least one of the first access code and a serial number displayed on the product, for identification of the second access code to a user.

BRIEF DESCRIPTION OF THE DRAWINGS

Further features and advantages will become apparent from the following detailed description made with reference to the accompanying drawing, wherein.

DETAILED DESCRIPTION

Figure 1:
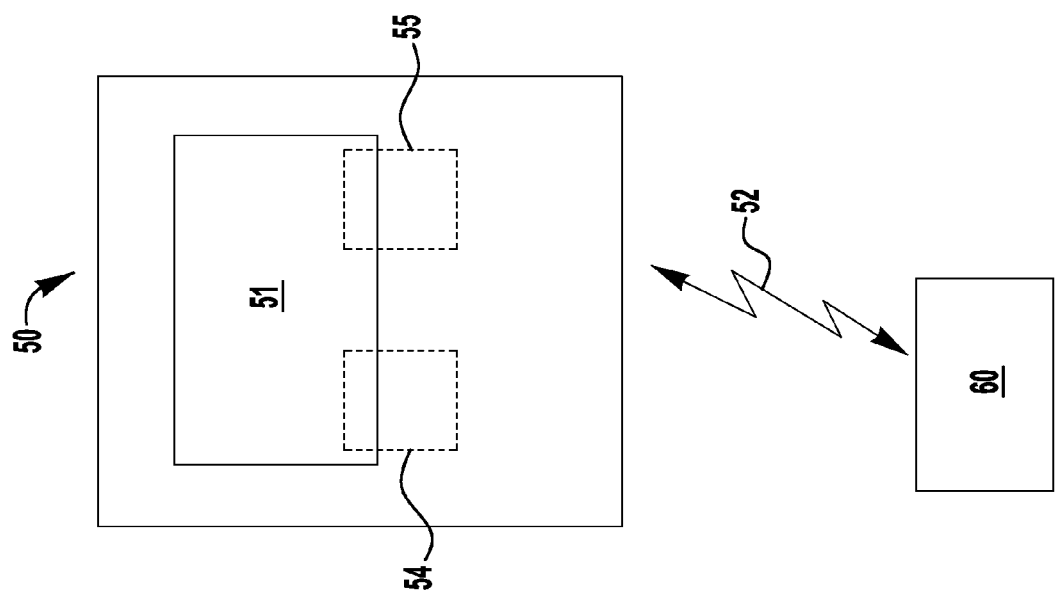
FIG. 1 is a block diagram of a lock and access code management system, according to an exemplary embodiment.
Figure 1:
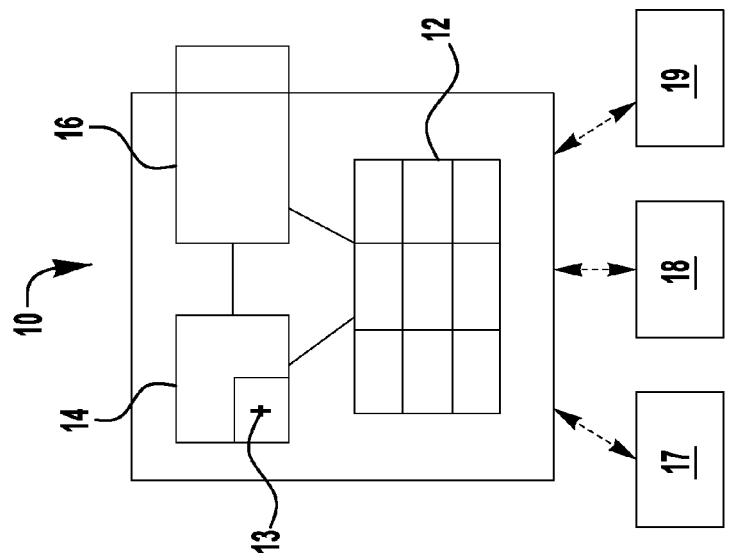

This Detailed Description merely describes exemplary embodiments of the invention and is not intended to limit the scope of the specification or claims in any way. Indeed, the invention as claimed is broader than and unlimited by the exemplary embodiments, and the terms used in the claims have their full ordinary meaning.

Also, while the exemplary embodiments described in the specification and illustrated in the drawings relate to web-based management systems for stand alone, non-networked electronic combination locks, it should be understood that many of the inventive features described herein may also be applied to other types of locks, including, for example, networked electronic locks and mechanical combination locks, other types of access protected devices (e.g., cell phones, computers, home security systems, thermostats, vehicles, and other electronic or electromechanical equipment), and other types of access code management systems, including, for example, software-based management systems.

As used herein, an access protected device may include, for example, any device for which entry of an authorized access code (e.g., on a keypad, combination dial, or other such code interface) permits access to one or more features or functions of the device, including, for example, opening or unlocking of the device (e.g., for a padlock, locker lock, safe, or other locking arrangement) or one or more electronic controls of the device (e.g., submitting or receiving information, performing some electronic, electrical, or electromechanical function, or other operation of the device).

The following are definitions of exemplary terms used throughout the disclosure. Both singular and plural forms of all terms fall within each meaning:

"Software" or "computer program" as used herein includes, but is not limited to, one or more computer or machine readable and/or executable instructions that cause a computer, microprocessor, logic circuit, or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, an app, a function call, a servlet, an applet, instructions stored in a memory or any other computer readable medium, part of an operating system or other type of executable instructions. It will be appreciated by one of ordinary skill in the art that the form of software is dependent on, for example, requirements of a desired application, the environment it runs on, and/or the desires of a designer/programmer or the like.

"Mobile Application" or "Mobile App" or "App" as used herein, includes, but is not limited to, applications that run on smart phones, tablet computers, and other mobile devices. The terms "Mobile Application" or "Mobile App" or "App"

can be used synonymously with "software". Mobile applications allow users to connect to services which are traditionally available on the desktop or notebook platforms. Typically, these services access the internet or intranet or cellular or wireless fidelity (Wi-Fi) networks, to access, retrieve, transmit and share data.

"Computer" or "processing unit" as used herein includes, but is not limited to, any programmed or programmable electronic device, microprocessor, logic circuit, that can store, retrieve, and process data.

A "Network" as used herein, includes, but is not limited to, a collection of hardware components and computers or machines interconnected by communication channels that allow sharing of resources and information, including without limitation, the worldwide web or internet.

A "Web browser" as used herein, includes, but is not limited to, a software for retrieving and presenting information resources on the World Wide Web. An information resource may be a web page, an image, a video, or any other type of electronic content.

A "Server" as used herein, includes, but is not limited to, a computer or a machine or a device on a network that manages network resources. The general term "Server" may include specific types of servers, such as a File Server (a computer and storage device dedicated to storing files), Print Server (a computer that manages one or more printers), a Network Server (a computer that manages network traffic), and a Database Server (a computer system that processes database queries). Although servers are frequently dedicated to performing only server tasks, certain multiprocessing operating systems allow a server to manage other non-server related resources.

A "Web Server" as used herein, includes, but is not limited to, a server which serves content to a Web browser by loading a file from a disk and serving it across a network to a user's Web browser, typically using a hyper text transfer protocol (HTTP).

The present application contemplates an access code management system for facilitating recall, use, and retention of access codes for various access protected devices, including electromechanical combination locks. According to an aspect of the present application, an access protected device may be configured to be accessed or operated by an access code that may be obtained by the user from an electronically accessible code storage unit. The electronically accessible code storage unit may, for example, be a software-based or web-based database disposed on a computer readable medium (e.g., a remote server, central computer network, personal computer, laptop computer, tablet computer, cell phone, or smart phone) configured to securely store and disseminate access codes associated with one or more access protected devices, as identified by an entry code provided by the end user (e.g., by entry into a smart phone, personal computer, laptop computer or other such user terminal). Each access code may, but need not, be unique to the device with which it is associated. According to an aspect of the present application, an entry code specific to an access protected device may be associated with one or more access codes stored in a database before the device is provided to an end user. The device may be configured to permit user access to or operation of one or more features or functions of the device in response to user entry of the access code. While this system stored access code may be displayed on a product (e.g., on the device or on a packaging element provided with the device) when the device is provided to an end user (e.g., identified on a label or other product packaging), in another exemplary embodiment, the authorized access code may be withheld or hidden from the end user, such that the end user has to communicate with the electronic access code management system to obtain the hidden access code from the electronically accessible database.

To limit access to a hidden access code in an electronic system, a device may be provided to an end user with an entry code that may be used to obtain access to the hidden access code associated with the device, by entering the entry code in a user terminal (e.g., a computer or smart phone) utilizing, for example, a software or web-based system. In an exemplary embodiment, the entry code may include an original access code, including, for example, an access code that may be selectively changed or disabled by the user or a limited use access code that is automatically disabled after a predetermined time period or number of uses. In another embodiment, an entry code may include a serial number marked on the device itself or a product code provided with the device packaging or on a sales receipt or sales invoice corresponding to a sale of the product (including, for example, an electronic sales acknowledgement via e-mail, text message, or web communication). The identification of the entry code on the product (e.g., on the device or on product packaging) or communicated as part of a sales transaction may be accompanied with a web address or other such instructions for accessing the access code management system. While the database may require only the entry code to provide the hidden access code to the user, in an exemplary embodiment, the database system may prompt the user for additional information to impede unauthorized access to the hidden code. Examples of additional security information may include, for example, all or part of a credit card number or account number used to purchase the product, identification of a location or date of purchase of the product, the name of the purchaser, or a user pin number provided by the user at the time of purchase.

When the entry code is communicated to a code storage unit (e.g., via a web site) to obtain the hidden access code, the system may be configured to prompt the end user for submission of secure access information (e.g., user name, password, secure personal information), such that future attempts to obtain a hidden access code associated with the device may require entry of the secure access information to confirm the identity/authorization of the user. The entry of secure access information may also involve registration of the device to the end user and/or creation of a user account, which may facilitate the association of multiple access protected devices with the user, or the storing of other consumer or device usage data. Conventional methods of obtaining forgotten user names or passwords (e.g., by supplying a registered e-mail address to receive the forgotten information at that e-mail address, or by providing secure personal identifying information) may be utilized to facilitate subsequent user access to the stored hidden access code or codes.

In an exemplary embodiment, an access protected device may also be configured for optional authorized access without communication with the access code management system. In such an embodiment, the device may be provided with an initial, primary, or first access code, identified, for example, on a label or other product packaging material to allow for immediate access to or operation of the device. This first access code may permit full or partial access to the functions and features of the device. In one embodiment, the first code functions as a "try me" code to permit limited functionality sufficient to demonstrate features of the device prior to purchase (e.g., while the device is still in its packaging). In another embodiment, a device may be provided with a fully functional primary or first access code and a separate limited functionality "try me" code (which may be a simple, single button entry). The device may be configured to delete or disable the "try me" code/functionality upon first use of a hidden or second access code or full function primary or first access code. The first access code may, but need not, also be associated with the device in the access code management database, and may function as an entry code for user access to the hidden code from the database.

In some such embodiments, the primary access code may be selectively changed by the user, for example, through authorized manipulation of a code changing mechanism of the device (e.g., circuitry or software enabling a code change procedure using keypad command entry, or an authorized code change key or key code) to a third access code (which may, but need not, be selected by the user). While operability of the device using the first access code may be maintained, in other embodiments, operation of the product in response to user entry of the first access code is prevented upon selection of the third access code using the code changing mechanism. For devices for which the primary, known access code has been changed or where the packaging element displaying the primary access code has been misplaced or discarded, authorized use of the device may be prevented or impeded. When the primary access code (either the original (first) access code or a user selected (third) access code) has been forgotten, access to a database associating the product serial number, first access code, or some other entry code with a hidden (i.e., not displayed on the product) or second access code for authorized operation of the device and stored in an electronically accessible database allows for operation of the device. As an access code that may be more frequently used and may be changed by the user, the primary access code may be a shorter sequence of keypad entries (e.g., four entries) than the hidden access code (e.g., six entries), which may be a more permanent access code or may enable additional controls of the lock (e.g., auditing features).

Different hidden access code storage and activation arrangements may be utilized by an access code maintenance system. In one exemplary embodiment, one or more hidden access codes stored on an access protected device may be permanently associated with each access protected device in an electronic access code management system. The access protected device may be configured such that the permanent hidden access codes are unchangeable and may always be used to access one or more features of the device. In another embodiment, an access protected device may be accessed or operated by a series of temporary or limited use hidden access codes, for example, to prevent unauthorized users (including previously authorized users) from continuing to use a learned hidden access code. The device may be configured such that, at a given time, one or more hidden access codes are active or effective to operate the device, and one or more hidden access codes are inactive or ineffective to operate the device (e.g., either deactivated or not yet activated). The access protected device may be configured to maintain the hidden access codes in a "rolling code" or automated code change arrangement or algorithm. Such an arrangement may utilize one or more code management functions, including, for example: (a) deactivating an active access code after a predetermined number of uses; (b) deactivating an active access code at a predetermined time or after a predetermined period of time from first use; (c) deactivating a first active access code upon first use of a second active access code; (d) activating an inactive access code at a predetermined time; and (e) activating a second access code upon deactivation of a first access code.

To effectively manage the series of hidden access codes, the access protected device may be initially synchronized with the electronically accessible database, such that the same series or set of hidden access codes is stored on the device and associated with the device in the database. In another embodiment, matching code generating algorithms (e.g., a random or pseudo-random number generator, hash function, or other encryption) may be stored on the device and associated with the device in the system, each configured to generate secure hidden access codes as they are needed (e.g., upon deactivation of a previous access code). By utilizing matching sets of access codes or access code generating algorithms, the system can identify which access codes are active on the device based on which access codes have already been provided by the system, the time at which a hidden access code is requested, or some other condition identifiable by the system.

FIG. 1 is a schematic representation of an electronic keypad combination lock 10 and corresponding access code management arrangement 50. The exemplary lock 10 includes a keypad 12 (or other such code interface), internal electronics 14 (e.g., a microprocessor, hardwired digital and/or analog circuitry, etc.) in communication with the keypad, and an electromechanical locking mechanism 16 (or other such access restricting mechanism) in communication with the electronics 14 and configured to permit operation of the device (e.g., to move a locking element from a locked condition to an unlocked condition) in response to a keypad entry of an active access code. The exemplary lock 10 is provided with a first indicium 17, for example, on an instruction sheet, label, or other packaging material, identifying an entry code for obtaining a hidden access code from an electronic access code management system. The exemplary lock 10 is also provided with a second indicium 18, for example, on an instruction sheet, label, or other packaging material (which may, but need not, be the same material on which the first indicium is provided), identifying a procedure for accessing the electronic access management system. The second indicium may include a web address, e-mail address, or a Quick Response (QR) matrix barcode or other scannable code (such scannable codes are well known and can be scanned with a portable electronic device such as a cell phone) to direct the user to a website where the login code may be entered to obtain the hidden access code. Any communication and/or access described herein can be made wirelessly, for example, through a radio wave Wi Fi network or over a wired or wireless Internet connection. The exemplary lock 10 may additionally be provided with a user operable (e.g., via the keypad 12 or some other user operable component) code changing mechanism 13 configured to modify the locking mechanism 16 to permit operation of the lock 10 in response to user entry of a user selected third access code, using the keypad 12. The third access code may replace the first access code as a primary access code, such that subsequent operation of the lock using the first access code is prevented. The user operable code changing mechanism may utilize any suitable electronic, electromechanical, or mechanical mechanism, including, for example, circuitry in communication with the keypad 12, a mechanical or electromechanically operable keyway, or a wireless transceiver for receiving and processing an authorized wireless code changing signal.

The exemplary access code management arrangement 50 includes a server 51 that may be operated by or on behalf of a service provider that licenses, sells, leases or otherwise provides the locks 10 to end users. The exemplary locks 10 are stand alone, non-networked locks that do not communicate with the server. In other embodiments, the locks may be configured for temporary initial and/or periodic communication with the server, for example, to synchronize clock units, transfer audit data, or reset/replace stored access codes or access code generating algorithms.

The server 51 may be accessed by retailers, suppliers, or end users through an electronically accessible connection 52 (e.g., a wireless Internet or cellular connection) from a computer, smart phone, or other such device 60, to obtain one or more hidden access codes for one or more locks 10, using the access procedure identified on the second indicium 18. The exemplary server 51 includes a code storage unit 54 (e.g., a memory module, disc, hard drive, server, or other computer readable medium, or a hardware or software database) which stores and associates device identifying data (e.g., serial number, first access code, or other such entry code) with corresponding hidden access code data (corresponding to the access codes stored on the device), for example, in a database. The code storage unit 54 is also configured to store user specific data entered when the user obtains a hidden code, with the user specific data that is also associated with the corresponding device date and hidden access code data in the database. The code storage unit may additionally include one or more encrypted code generating algorithms (e.g., a random or pseudo-random number generator, hash function, or other encryption) associated with the stored device identifying data and synchronized with corresponding algorithms included on the corresponding devices. The server 51 also includes an interface unit 55 to provide the interface for the server to the Internet (e.g., via a web server and/or an e-mail engine) or other such communication network, to obtain user specific data and to deliver the requested hidden access codes.

The lock 10 may additionally be provided with a third indicium 19 which identifies a primary access code that can already operate the lock (i.e., stored as an active access code in the electronics 14), such that the user does not have to obtain an access code from the access code management system 50 to operate the lock. As discussed above, in some exemplary embodiments, the primary or first access code may additionally function as an additional or alternative entry code for obtaining the hidden access code, and may eliminate the use of a separate entry code and indicium.

Figure 2:
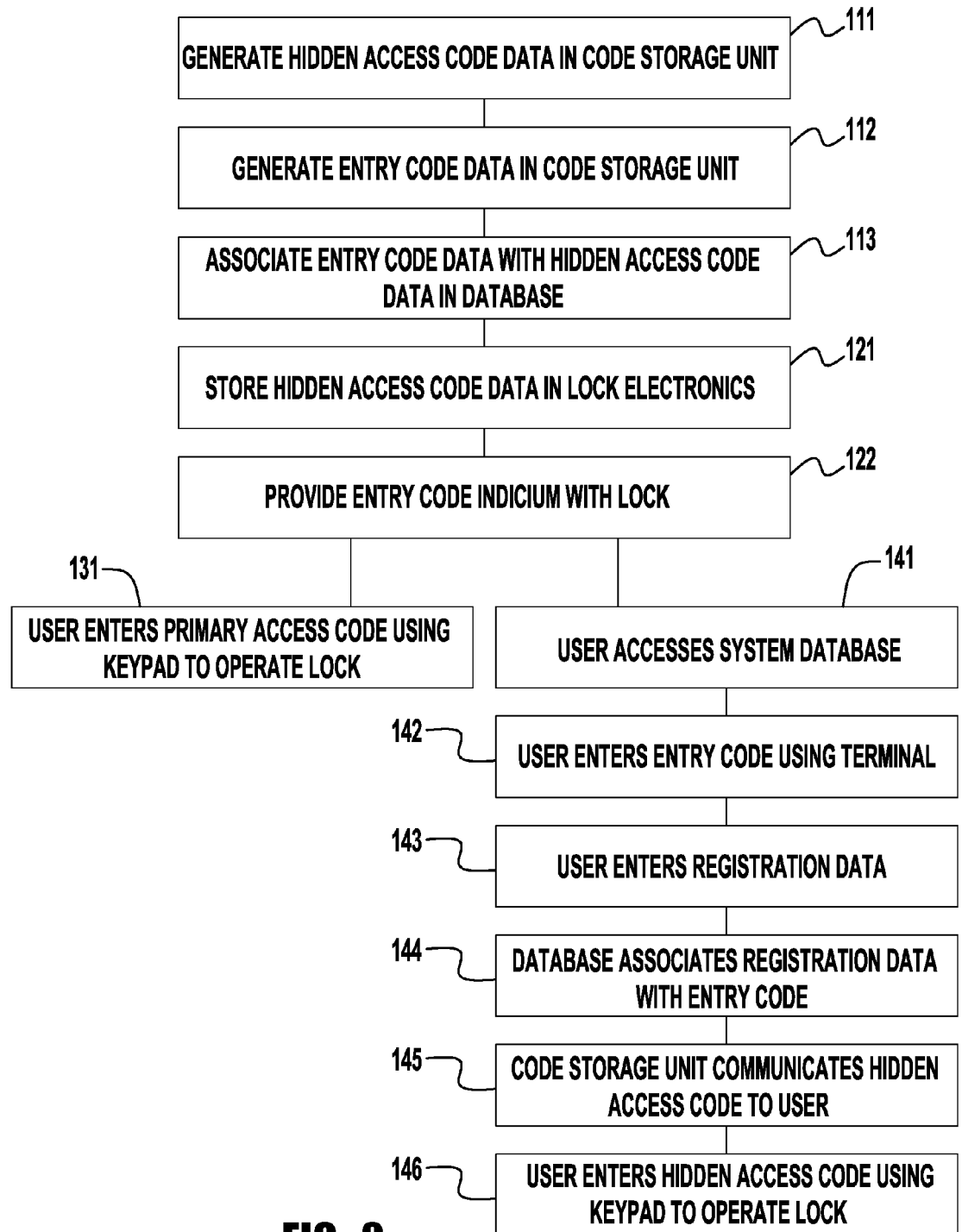
FIG. 2 is a block diagram illustrating a process and software flow for maintaining and using an access code management system to support operation of an electronic combination lock, according to an exemplary embodiment.

To maintain and use an access code management system to support operation of an electronic combination lock, as shown in FIG. 2, hidden access code data and entry code data are generated for the lock in a code storage unit (at blocks 111 and 112). For example, a programming computer may communicate with the lock (e.g., wirelessly or by a wired connection) to program the hidden access code data and entry code data into the code storage unit of the lock. The entry code data is associated with the hidden access code data in a database accessible by the code storage unit (block 113). At least corresponding hidden access code data (and optionally primary access code data) are stored in the electronics of the lock (block 121), for example, as firmware. An entry code indicium, and optionally a primary access code indicium, are provided with the lock (e.g., marked on an instruction sheet, directly on the lock, on a removable label or other packaging material, or on a sales receipt or invoice) (block 122).

When the end user receives the exemplary lock, the end user may operate the lock by entering a primary access code using the lock keypad, by referring to the primary access code indicium provided with the lock (block 131), if the access code indicium is so provided. Alternatively, the end user may access the access code management system database using a user controlled terminal (e.g., a computer or smart phone with wireless web access), for example, using system access instructions provided on product displayed indicium (block 141). The end user enters the entry code (e.g., access code, serial number or login code displayed on the product) using the terminal (block 142), and optionally enters additional personal data to register the lock and/or create an account (block 143), which may be stored in the code storage unit and is associated with the corresponding hidden code(s) and login code (block 144). The user may additionally supply to the database one or more additional access codes (e.g., user generated access codes) to store in the code storage unit and to associate with the lock identifying entry code, for example, for future recall of the stored access codes by accessing the system and entering at least one of the entry code and corresponding personal data (e.g., a user name and password). The access code management system communicates the hidden access code corresponding to the entered entry code (block 145), which also corresponds to the activated hidden access code stored in the lock electronics. The end user may then enter the provided hidden access code on the lock keypad to operate the lock (block 146).

One or more primary or hidden access codes may be configured to permit access to one or more additional or alternate lock functions. For example, an access code may be configured to display a battery level indicator for the lock, identification of other active access codes, an audit trail identifying past usage of one or more access codes (which may be associated with one or more specific users of the lock to identify usage by the specific users), disabling of an LED display (or other such power consuming function) to extend battery life, access to a battery door to replace a depleted battery, code changing functions, or other such operations. In an exemplary embodiment, the first or primary access code provided with the product may be used to access or perform a first set of functions of the device, and the second or hidden access code may be used to access or perform a second set of functions different from the first set of functions. In one example, the first set of functions may be a subset of the second set of functions. For example, the first set of functions may be limited to unlocking an electromechanical combination lock, while the second set of functions may include auditing of past access attempts, access code changing or disabling, and/or restoring the lock to an original condition (e.g., re-activate primary access code displayed on lock).

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

We claim:

1. A method of managing access codes for an access restricted product including a code interface for entry of an access code to permit operation of the product, the method comprising:
providing the product with an access restricting mechanism configured to permit operation of the product in response to entry of either one of a first access code and a second access code using the code interface;
providing the product with indicia identifying the first access code and a product code and without identifying the second access code;
providing an electronically accessible code storage unit associating the second access code with at least one of the first access code and the product code; and
identifying the second access code to a user, for subsequent user entry of the second access code using the code interface, in response to user input of the at least one of the first access code and the product code into a terminal in communication with the code storage unit;
wherein the second access code is associated with the at least one of the first access code and the product code in the electronically accessible code storage unit prior to any user input of the at least one of the first access code and the product code into the terminal in communication with the code storage unit.

2. The method of claim 1, wherein the product includes a device and a packaging element provided with the device, the indicia identifying at least one of the first access code and the product code is provided on at least one of the device and the packaging element.

3. The method of claim 1, the indicia identifying at least one of the first access code and the product code is provided on at least one of a sales receipt and a sales invoice corresponding to a sale of the product.

4. The method of claim 1, wherein the access restricting mechanism is configured to permit performance of a first set of functions by the product in response to user entry of the first access code, and wherein the access restricting mechanism is configured to permit performance of a second set of functions by the product in response to user entry of the second access code, the second set of functions being different from the first set of functions.

5. The method of claim 4, wherein the first set of functions is a subset of the second set of functions.

6. The method of claim 4, wherein the second set of functions includes restoring the access restricting mechanism to an original condition.

7. The method of claim 4, wherein the second set of functions includes modifying the access restricting mechanism to subsequently permit operation of the product in response to user entry of the first access code using the code interface.

8. The method of claim 1, further comprising receiving user registration information from the terminal prior to identifying the second access code to the user.

9. The method of claim 1, further comprising establishing a user account prior to identifying the second access code to the user.

10. The method of claim 1, wherein the access restricting mechanism is further configured to prevent operation of the product in response to entry of the second access code using the code interface after one of a predetermined number of entries of the second access code using the code interface and a predetermined elapsed time after a first entry of the second access code using the code interface.

11. The method of claim 10, wherein after the one of the predetermined number of entries of the second access code using the code interface and the predetermined elapsed time after the first entry of the second access code using the code interface, the access restricting mechanism is configured to permit operation of the product in response to entry of a third access code using the code interface.

12. The method of claim 11, further comprising associating the third access code with at least one of the first access code and the product code in the code storage unit, and thereafter identifying the third access code to the user in response to user input of the at least one of the first access code and the product code.

13. The method of claim 12, wherein the access restricting mechanism is further configured to generate the third access code using a first algorithm and the electronically accessible code storage unit is configured to receive the third access code from a second algorithm matching the first algorithm.

14. The method of claim 1, further comprising providing access to the electronically accessible code storage unit on a web site.

15. The method of claim 1, further comprising providing the product with a user operable code changing mechanism configured to modify the access restricting mechanism to permit operation of the product in response to user entry of a user selected third access code using the code interface, and to thereafter prevent operation of the product in response to user entry of the first access code using the code interface.

16. An access code management system for an access restricted product, the system comprising:
a product comprising:
a code interface;
an access restricting mechanism configured to permit operation of the product in response to entry of either one of a first access code and a second access code using the code interface; and
indicia identifying the first access code and a product code and without identifying the second access code; and
a user controlled terminal configured to access a code storage unit associating the second access code with at least one of the first access code and a product code displayed on the product, for communication of the second access code to the user controlled terminal in response to user input of the at least one of the first access code and the product code into the user controlled terminal, for subsequent user entry of the second access code into the code interface;
wherein the second access code is associated with the at least one of the first access code and the product code in the electronically accessible code storage unit prior to any user input of the at least one of the first access code and the product code into the terminal in communication with the code storage unit.

17. The system of claim 16, wherein the user controlled terminal communicates with the code storage unit through a server remote from the product.

18. The system of claim 16, wherein the user controlled terminal comprises one of a computer and a smart phone.

19. The system of claim 16, wherein the product includes a device and a packaging element provided with the device, wherein at least one of the first access code and the product code is displayed on at least one of the device and the packaging element.

20. The system of claim 16, wherein the code interface comprises an electronic keypad.

21. The system of claim 16, wherein the product comprises an electromechanical locking device.

22. The system of claim 16, wherein the product further comprises a user operable code changing mechanism configured to modify the access restricting mechanism to permit operation of the product in response to user entry of a user selected third access code using the code interface, and to thereafter prevent operation of the product in response to user entry of the first access code using the code interface.

\* \* \* \* \*